US 8,185,918 B2

(12) United States Patent
Meerwald et al.

(10) Patent No.: US 8,185,918 B2
(45) Date of Patent: May 22, 2012

(54) METHOD AND SYSTEM FOR MANAGING ACCESS TO ADD-ON DATA FILES

(75) Inventors: Peter Meerwald, Salzburg (AT); Robert Yates, Oberalm (AT); Oliver Kubera, Salzburg (AT); Thomas Augustin, Anif (AT)

(73) Assignee: SONY DADC Austria AG, Anif (AT)

( * ) Notice: Subject to any disclaimer, the term of this patent is extended or adjusted under 35 U.S.C. 154(b) by 501 days.

(21) Appl. No.: 12/440,728

(22) PCT Filed: Aug. 29, 2007

(86) PCT No.: PCT/EP2007/007552
§ 371 (c)(1),
(2), (4) Date: May 28, 2009

(87) PCT Pub. No.: WO2008/031499
PCT Pub. Date: Mar. 20, 2008

(65) Prior Publication Data
US 2009/0320051 A1 Dec. 24, 2009

(30) Foreign Application Priority Data

Sep. 15, 2006 (EP) .................................. 06019350

(51) Int. Cl.
*G06F 13/00* (2006.01)
(52) U.S. Cl. .......................................... 719/328; 726/2
(58) Field of Classification Search .................. 719/328; 726/2
See application file for complete search history.

(56) References Cited

U.S. PATENT DOCUMENTS

| 5,689,560 A | 11/1997 | Cooper et al. |
| 7,584,471 B2 * | 9/2009 | Bjare et al. ..................... 717/178 |
| 2005/0050315 A1 | 3/2005 | Burkhardt et al. |
| 2005/0193213 A1 | 9/2005 | Johnson et al. |
| 2005/0278716 A1 | 12/2005 | Koppen et al. |
| 2007/0150937 A1* | 6/2007 | Gatto et al. ....................... 726/1 |
| 2008/0021836 A1* | 1/2008 | Lao ................................ 705/54 |

FOREIGN PATENT DOCUMENTS

| EP | 0 679 979 | 11/1995 |
| EP | 1 515 238 | 3/2005 |
| EP | 1 571 526 | 9/2005 |

OTHER PUBLICATIONS

Summons to attend Oral Proceedings issued Jul. 1, 2011 in Europe Application No. 06019350.5.
Office Action issued Nov. 9, 2011, in European Patent Application No. 06 019 350.5.

\* cited by examiner

*Primary Examiner* — Andy Ho
(74) *Attorney, Agent, or Firm* — Oblon, Spivak, McClelland, Maier & Neustadt, L.L.P.

(57) ABSTRACT

A method and system for managing access to add-on data files having an add-on data file attribute, which is used by a software application. The method: monitors input/output commands of the software application to an application programming interface of a code layer to determine whether an access to a data file with the add-on data file attribute is requested by the software application; checks whether an access code for the add-on data file is present in an access code list related to the software application if at least one of the monitored input/output commands request access to the add-on data file, if the access code is not present in the access control list; retrieves the access code from an external source outside of the access control list; and provides access to the add-on data file if the access code is present.

16 Claims, 3 Drawing Sheets

METHOD AND SYSTEM FOR MANAGING ACCESS TO ADD-ON DATA FILES

TECHNICAL FIELD

The invention relates to a method and a system for managing access to at least one add-on data file having an add-on data file attribute, which is used by a software application.

BACKGROUND

Successful computer software applications, in particular computer games, often result in the wish of the users of such software applications to enhance the capabilities of the software applications by using additional add-on data files, such as additional level files for computer games, additional map files for navigation programs, additional font files for word processing programs or other extension files. Since the economic success of such software applications often can not be foreseen, such additional add-on files are often not included into the original software application. The market for selling such additional add-on files, which have been developed by other programmers and are supplied by other suppliers than the original developers of the software application and the original suppliers is increasing. Nowadays such additional add-on data files often are provided via the Internet. Since the programmers, creators and suppliers of such add-on files also want to be reimbursed for their efforts, such add-on data files have to be protected against copying.

Such copy protection for add-on data files is not easy to achieve. One possibility is that the programmer of the original software application has to implement the access code layer, e.g. some sort of decryption/encryption algorithm, within the original software application, which is cumbersome and normally programmers of software applications, in particular computer games, are not experts in programming copy protection software. Additionally time constraints in developing computer games are quite severe, so that the additional effort to include a copy protection for add-on data files should be prevented. Furtheron, since the original programmer and original supplier are different from the programmers and suppliers of add-on data files, they are less motivated to include such a copy protection into the original software application.

In another approach the add-on data files are encrypted. A user who wants to use such additional add-on data files gets a decryption key after having paid for being allowed to use the add-on data file. However, after the add-on data file has been decrypted with the help of the decryption key, it is available for further unauthorized copying and distributing, thereby reducing the income for the programmer and supplier of the add-on data files.

It is an object of the present invention to provide a method for managing access to at least one add-on data file, which is used by a software application, that is easy to handle by a publisher of the software application and that provides an efficient protection against unauthorized copying of such add-on data files.

It is further object of the present invention to provide a system for managing access to at least one add-on data file, which is used by a software application, that is easy to use by a programmer of the software application, that provides an efficient protection against unauthorized copying of such add-on data files that is convenient to use by a user of such add-on data files.

SUMMARY OF THE INVENTION

The object is achieved in a first aspect by a method for managing access to at least one add-on data file having an add-on data file attribute, which is used by a software application, comprising the steps of:
  defining an access code for said add-on data file;
  monitoring input/output commands of said software application to an application programming interface (API) of a code layer to determine whether an access to a data file with said add-on data file attribute is requested by said software application;
  checking whether said access code is present in an access code list related to said software application if at least one of the monitored input/output commands request access to said add-on data file,
  if said access code is not present in said access control list, retrieving said access code from an external source outside of said access control list,
  providing access to said add-on data file if said access code is present.

When the software application tries to access a protected add-on data file, this access is intercepted by monitoring the use of the application programming interface and it is checked, whether an access code has already been obtained for the content of the add-on data file. Access is granted, if a valid entry in the access code list is found. A valid entry might comprise a date within a given time period of authorized usage or a user or hardware identification matching the current configuration or runtime environment. Otherwise it is tried to retrieve the access code from an external source outside of said access code list. The input/output command itself may remain unchanged, as it is the case for other input/output commands, e.g. to original data files of the software application. Therefore, the method is transparent, meaning that the software application has not to be aware of such method, it may simply perform as it has been intended by the original programmer. The software application does not have to be modified to implement access control to such add-on data files, the source code of the software application has not to be known in order to implement this method. On the other hand, since the access is controlled during runtime of said software application, there is no necessity to decrypt said add-on file before runtime, and so there is no possibility to copy a decrypted add-on file, because it simply does not exist separately on a file system.

The method itself is independent from the actual software application, since it has only to be known, which add-on data file attribute is used. In any case, when an access to an add-on data file with such add-on data file attribute is requested by the software application the method can be applied. The external source may be organized and supplied by third parties not involved in the programming of said software application.

With this method it is easy to achieve different ownership and responsibility for the software application and the add-on data files.

With a second aspect, a system for managing access to add-on data files having an add-on data file attribute which are used by a software application, comprising:
  an access code generator to generate an access code for said add-on data file;
  a not transferable access code list related to said software application;
  an external source outside of said access code list for getting said access code and
  a separate control logic for said software application, said separate control logic being adapted
    to check input/output commands of said software application to an application programming interface (API)

of a code layer whether an access to a data file with said add-on data file attribute is requested by said software application, to check whether said access code to access said add-on data file is present in said access code list if said input/output commands request access of said add-on data file, to check whether said access code can be obtained from said external source if said access code is not present in said access code list, and to provide access to said add-on data file if said access code is present is provided.

With the system it is possible that the control logic is build by experts for copy protection and the software application has not to be adapted especially for using such add-on data files. Since there is no special relationship between the software application and the control logic, the control logic is easily applicable to different software applications without changes. Since the access code list is not transferable, it is not possible to circumvent such copy protection scheme for add-on data files by simply copying the access code list.

With a third aspect, a system for managing access to add-on data files having an add-on data file attribute, comprising:

a software application for using said add-on data files during run-time;

a code layer for controlling access of said software application to said add-on data files, said code layer providing application programming interfaces (API);

an access code generator to generate an access code for said add-on data file;

an access code list related to said software application;

an external source outside of said access code list for getting said access code and a separate control logic for said software application, said separate control logic being adapted to check input/output commands of said software application to said application programming interface (API), whether an access to a data file with said add-on data file attribute is requested by said software application, to check whether said access code to access said add-on data file is present in said access code list if said input/output commands request access of said add-on data file, to check whether said access code can be obtained from said external source if said access code is not present in said access code list, and to provide access to said add-on data file if said access code is present, and a linking program to link said separate control logic with said software application so that said separate control logic and said software application are adapted to run in a same process is provided.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION

Figure 1:
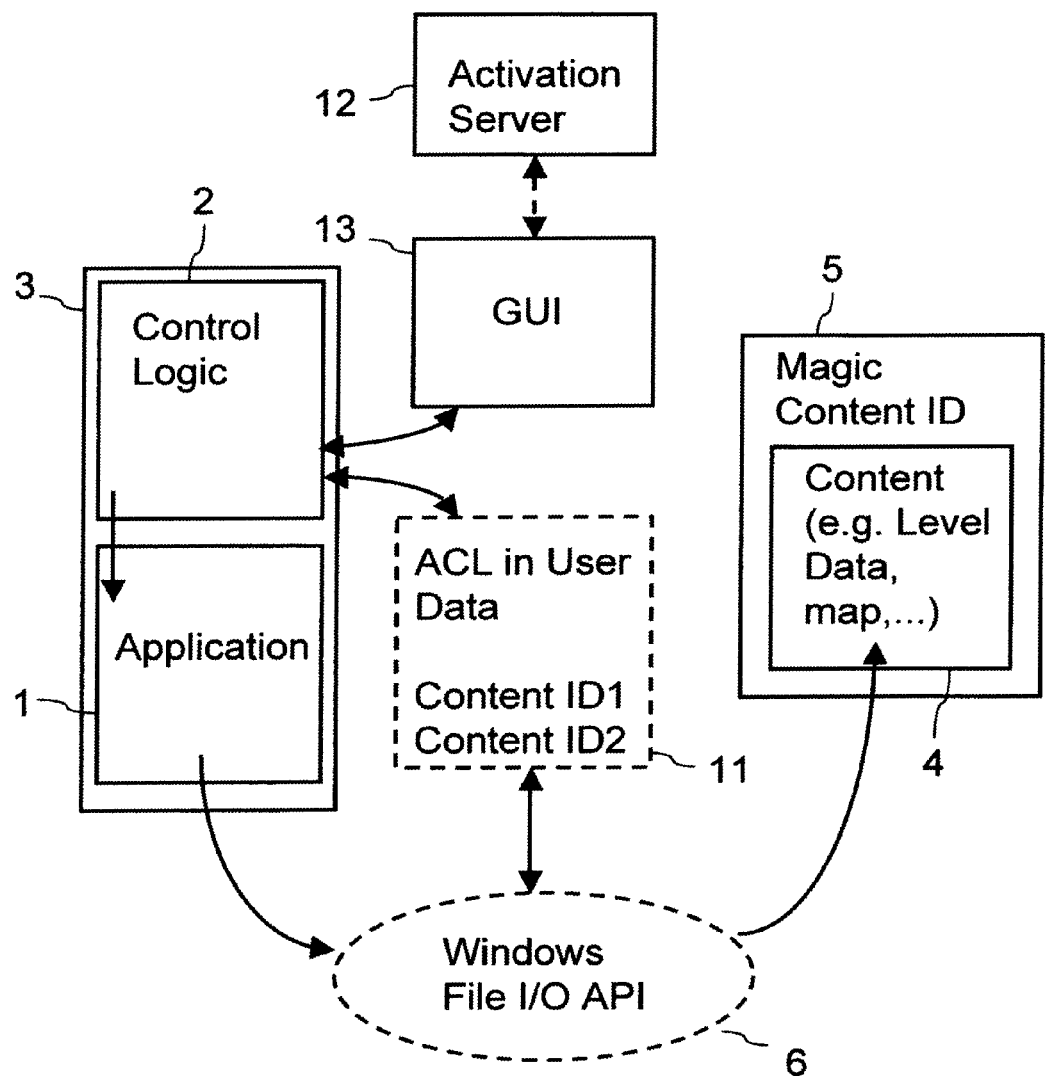
FIG. 1 shows a schematic block diagram of a first embodiment of a system to manage access to add-on data files.

In FIG. 1 a schematic block diagram of a first embodiment of a system to manage access for add-on data files is depicted. A software application 1, like e.g. a computer game, a word processing program or a navigation program is running together with a control logic 2 in one process 3. The control logic 2 may be used for protecting the software application 1 against unauthorized copying by providing a "wrapper" around the software application. Authorized use of the software application is established, e.g. by checking whether a user, who uses the software application has inputted a correct key before starting the software application. Such check is performed by the control logic 2. In order to facilitate handling of the software application 1 and the control logic 2, both parts are linked together with the help of a linking program and one executable object code is produced, which is running as one process on an appropriate hardware, e.g. a computer. Optionally, this process may be started only after an input of an additional authorization code or after an authentication of an optical disc.

For some software application there exist the possibility to enhance their capabilities by additional add-on data files 4, which might have different contents, depending on the software application 1. For example, in the case of a computer game as software application 1, such add-on data files, or data files interpretable by the software application, might include, but are not restricted to additional level files, additional character files for being used while playing, additional maps for additional territories for flight simulation programs and so on. Also other extension data files might be used, e.g. additional font files for word processing or additional maps for navigation programs. Often the creators, programmers, publishers and/or suppliers of such additional add-on data files 4 are different from the programmer of the original software application 1. In order to restrict unauthorized access to such additional add-on data files 4, there is the possibility to encrypt such add-on data files 4 and sell the decryption key. However, after having decrypted such encrypted add-on data file 4, it is difficult to prevent further unauthorized distribution of such add-on data files 4.

Within the depicted embodiment, the access of the software application 1 is controlled during runtime, by intercepting the access of the software application 1 to the add-on data files 4 by monitoring the input/output commands of an application programming interface (API) 6, which is provided by a code layer, e.g. an operating system like Windows©. In case that the software application 1 request access of a add-on data file 4, which is identified by an add-on data file attribute, the control logic 2 is checking, whether an access code to access such add-on data file 4, is present within an access code list 11, e.g. an access control list (ACL). Such access code is generated by a supplier or creator of the add-on data files 4 using a generation unit. The access code e.g. comprises a content identification (content ID) as a data file attribute and a hardware or user identification or a time period, during which such access code for the add-on data file with the content ID is valid. If such an access code for the add-on data file 4 is not present within the access code list 11, the control logic 2 tries to retrieve the access code from an external source, via a graphical user interface GUI, 13 and/or an activation server 12. The add-on data file attribute is used to identify the access request to an add-on data file 4 and may comprise, but is not restricted to a file format specification or a compilation date.

The graphical user interface GUI, 13 may be provided separately and may be used to manually input an access code directly by the user, which he/she has obtained beforehand, or to input a user identification. Such user identification can be used to check within the activation server 12, whether for this user an access to the add-on data file is allowed, e.g. because the user has bought the add-on data file correctly and has input his user identification to the activation server in order to identify for whom such access should be allowed. A corresponding "personalized" access is also possible with a hardware identification, which would be transmitted to the activation server 12 directly with the help of the control logic 2. So it is possible to grant a user or hardware specific access right to the add-on data file 4. It is even possible to allow that the user input payment data, e.g. credit card data, with the help of the graphical user interface 13, if during communication to the activation server 12 it is apparent that the user has not bought the corresponding access code so far and thereafter allowing to retrieve the access code, so that the user can use the add-on data file 4 immediately afterwards. The communication might be performed via the Internet.

If the access code is available via said external source, i.e. via the graphical user interface 13 and/or the activation server 12, then this access code may be stored within the access code list 11 afterwards in order to accelerate further accesses to this add-on data file 4. Additional validation information might be stored as well, e.g. dates of a time period, in which access is allowed, the user identification or the hardware identification. In addition access to the add-on data file 4 is granted during runtime of the process 3. The access code might include a decryption key in order to decrypt an encrypted version of the add-on data 4 during runtime.

In order to prevent unauthorized copying of the add-on data file the software application should be prevented from storing the original or a modified version of the add-on data file 4, unless in this case there is a further copy protection available for such stored add-on data files 4. Checking with the help of the control logic 2 whether the software application 2 is trying to write a file onto the file system, might ensure such prevention.

The access code list 11 it not transferable, e.g. hidden in a file system or secured by further measures against copying. Otherwise it would be possible to copy such access code list 11 in order to make unauthorized use of add-on data files 4 possible. Another possibility is to make use of the hardware identification or the user identification, which is checked, when an access to an add-on data file is requested.

The access code is stored in the access control list 11 and built with the help of content identifications (Content ID1, Content ID2) of the add-on data files, which are useable as data file attributes.

The data files attributes might be further realized as a special combination of values, commonly referred to as "magic" values.

Figure 2:
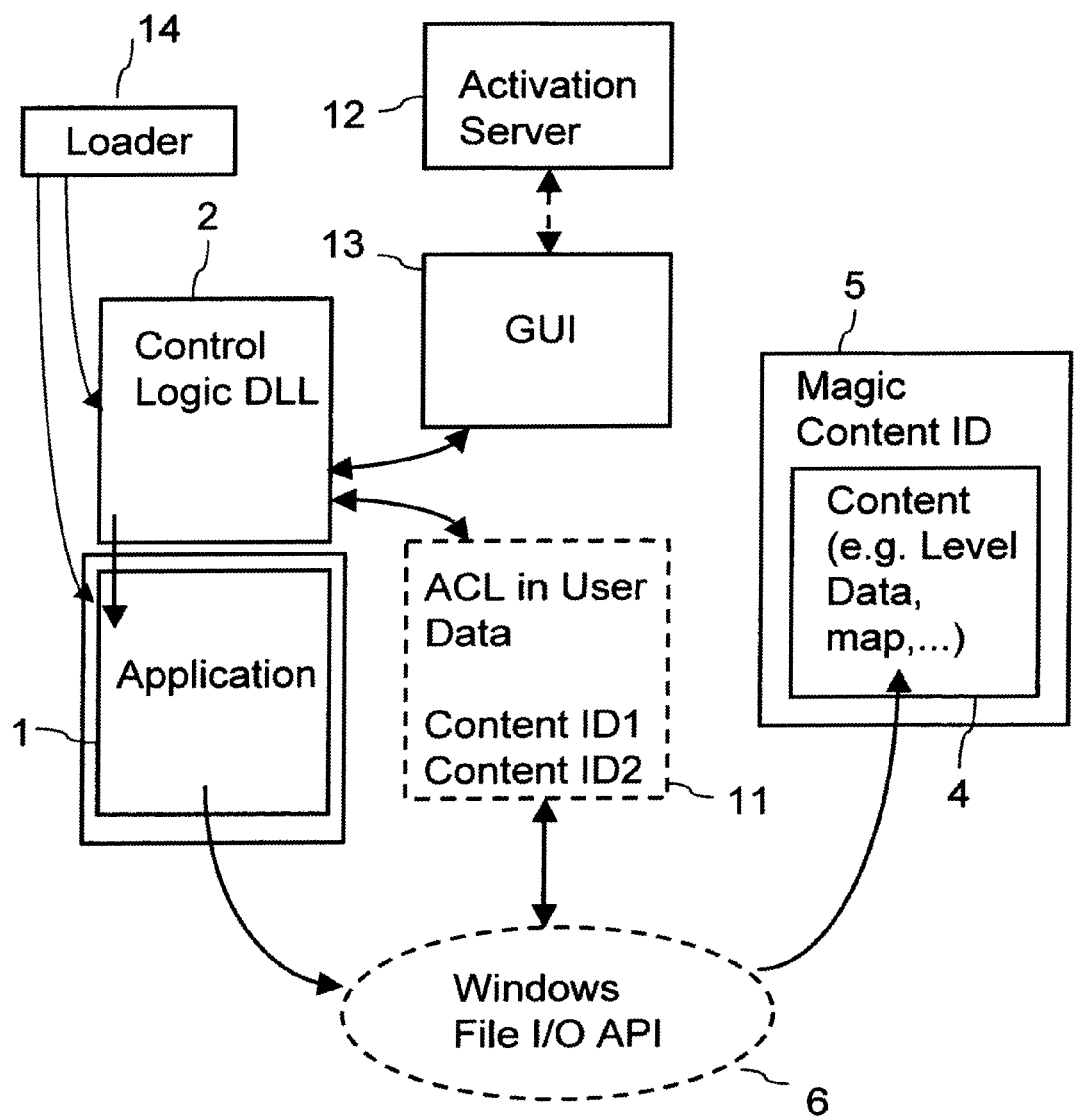
FIG. 2 shows a schematic block diagram of a second embodiment of a system to manage access to add-on data files.

In FIG. 2 a second embodiment of a system to manage access to add-on data files is depicted. It is similar to the first embodiment, so that same blocks which same functions as in FIG. 1 have been identified by same numerals and are not explained again here. In this second embodiment the linking of the software application 1 and the control logic 2 is performed dynamically during runtime by loading a dynamic link library (DLL) with the control logic 2 into a process of the software application 1 at runtime with the help of a loader 14. In the first embodiment the linking has been performed statically by building one executable file before runtime.

Figure 3:
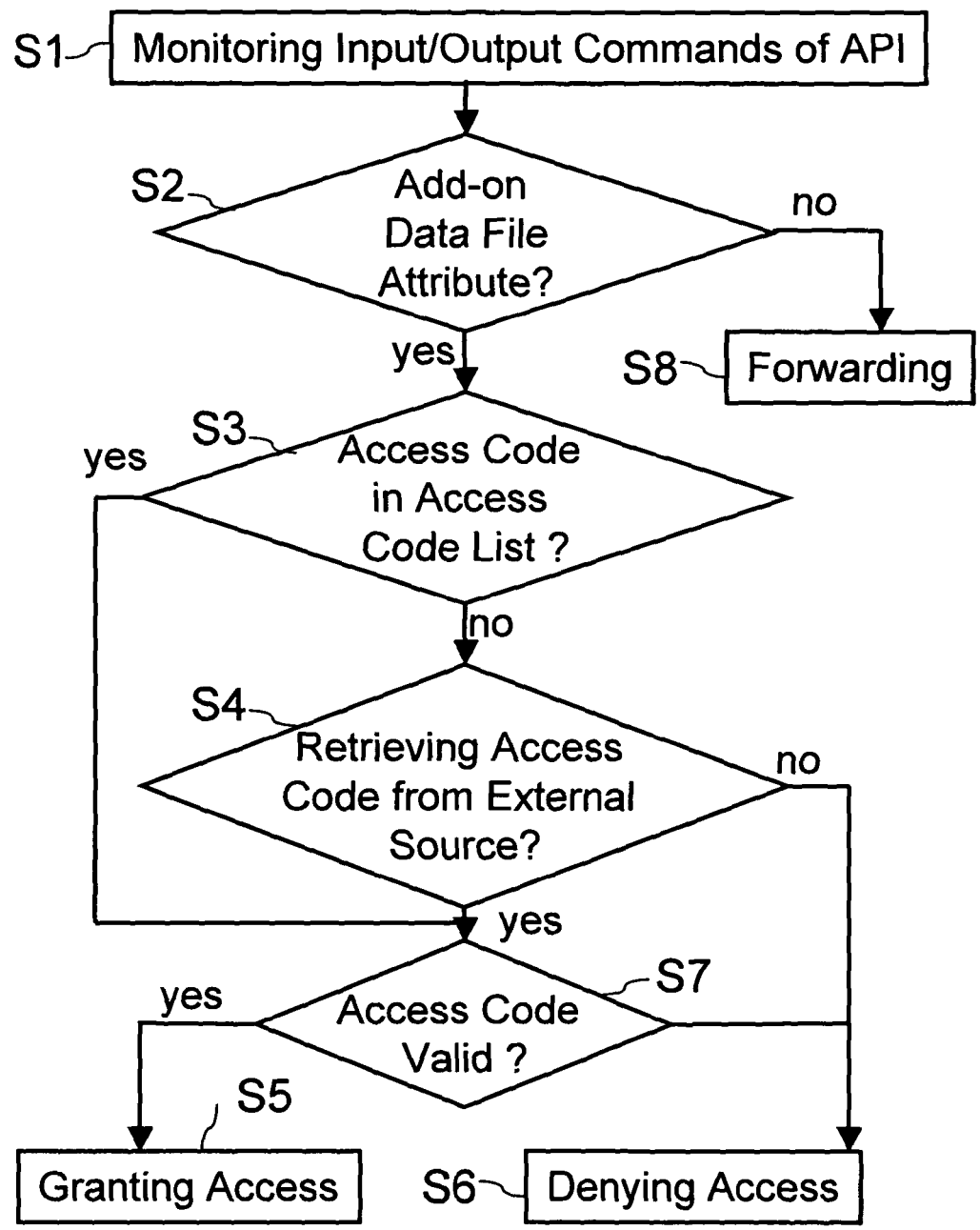
FIG. 3 shows method steps to manage access to add-on data files.

In FIG. 3 the method steps of are depicted. In a first step S1, during runtime of the software application 1, its input/output commands to the application programming interface API are monitored. If, during that monitoring, the control logic recognizes that a data file with an add-on data file attribute is requested in a second step S2, then it is checked, whether an access code for the requested add-on data file 4 is present in the access code list 11 in a third step S3. If the access code is not available in the access code list 11, the control logic retrieves the access code from an external source 12,13 in a forth step S4. Access to the add-on data file 4 is granted in a fifth step S5, if such access code is present, either at the external source 12, 13 or within the access code list 11, otherwise access is denied in a sixth step S6. Optionally, it may be checked in seventh step S7, whether the access code is valid, e.g. whether a time period in which an access is allowed is met or whether the correct user or hardware corresponding to a stored user identification or hardware identification is requesting the access. If no data file with the add-on data file attribute is requested in the second step S2, then the request is simply forwarded in an eighth step S8.

A very efficient way to determine, whether a request to an add-on data file 4 is performed, is to build the add-on data files 4 with respect to a predetermined file format specification, which can be used as a trigger to control the access of the software application 1.

If an access code which has been retrieved from an external source 12, 13 is stored within the access code list 11, further access requests to add-on data files 4 are handled faster, because there is no need to retrieve said access code from an external source 12, 13 again. In this case it is possible to additionally store a time period, in which such access code is valid or other validation information, e.g. the user or hardware identification.

A very efficient copy protection for add-on data files 4 is obtained, when the add-on data files 4 are encrypted. So there is no use for any unauthorized copying without owning a corresponding decryption key. The decryption key is coupled with the access code (it may be the access code itself), so that only a user having this access code is entitled to use such add-on data file 4, which is decrypted with the decryption key during runtime.

A convenient way to retrieve the access code is by demanding a manual input of the access code by the user. In this embodiment, the user has obtained the access code beforehand by buying a corresponding add-on data file 4 from an add-on data file provider.

A further convenient way to retrieve the access code is by connecting, e.g. via the Internet to an activation server 12, on which the access code is stored, after a user has bought such add-on data file 4 together with the corresponding access code. The activation server 12 might be supplied by a provider of add-on data files or by other third parties, e.g. the provider of the control logic 2. So there is no need for a programmer or supplier of the software application 1 to deal with such access authorizations.

A per-user or per-hardware access may be provided by ensuring a relation of a user or hardware to the access code. With such a per-user or per-hardware access rights unauthorized distribution of add-on data files is further hampered.

The method is especially useful for add-on data files 4 like level files and/or map files and/or style files and/or extension files for computer games as software applications.

A transparent and efficient way to implement this embodiment is to use a control logic 2, which is suited as well for authorizing use of the software application 1. So the programmer of the software application 1 only has to deal with the software application itself. The control logic 2 takes care of the copy protection namely the copy protection of the software application 1 and the copy protection of the add-on data files 4 as well.

A separate graphical user interface 13 for inputting the access code by the user or for inputting the user identification gives the possibility for the creator or supplier of add-on data files 4 to adapt such graphical user interface 13 in order to meet his demands, e.g. with respect to advertisement or payment schemes. It would also give the possibility to input payment data, like credit card data, if the user did not have bought an access code in advance but is intending to do so before the control logic 2 is communicating with the activation server 12.

A further possibility to identify accesses to add-on data files without using data file attributes is to define special application programming interfaces (API) between the software application 1 and the control logic 2 for such requests. This possibility needs cooperation between the software application 1 and the control logic. The special API can be used to improve the behavior of the software application 1 with respect to the access of add-on data files in case access is denied.

REFERENCE SYMBOLS

1 Software Application
2 Control
3 Process
4 Add-On Data File
5 Add-On Data File Attribute
6 Application Programming Interface API
11 Access Code List
12 Activation Server
13 Graphical User Interface GUI
14 Loader
S1 First Step
S2 Second Step
S3 Third Step
S4 Forth Step
S5 Fifth Step
S6 Sixth Step
S7 Seventh Step
S8 Eighth Step

The invention claimed is:

1. A method for managing access to at least one add-on data file having an add-on data file attribute, which is used by a software application, comprising:
monitoring with a computer input/output commands of the software application to an application programming interface of a code layer to determine whether an access to a data file with the add-on data file attribute is requested by the software application, wherein the monitoring input/output commands is performed by a separate control logic, which checks an authorized use of the software application;
checking whether an access code for the add-on data file is present in an access code list related to the software application if at least one of the monitored input/output commands request access to the add-on data file;
if the access code is not present in the access control list, retrieving the access code from an external source outside of the access control list; and
providing access to the add-on data file if the access code is present.

2. A method according to claim 1, wherein the add-on data file attribute comprises a file format specification, and the method further comprising:
determining whether the input/output commands request the access to the add-on data file by using the file format specification.

3. A method according to claim 1, further comprising:
storing the successfully obtained access code in the access code list.

4. A method according claim 1, further comprising
encrypting the add-on data file; and
decrypting the add-on data file with the help of the access code, if the add-on data file is requested by the software application.

5. A method according to claim 1, further comprising:
demanding a manual input of the access code by a user.

6. A method according to claim 1, further comprising:
connecting to an activation server as the external source; and
checking whether the access code is available on the activation server.

7. A method according to claim 6, further comprising:
providing a user identification for a user, who is allowed to use the software application, together with the add-on data files;
checking, while being connected to the activation server, whether the user identification corresponds to the user, who is actually using the software application; and
granting the access only to the user with the user identification.

8. A method according to claim 1, further comprising:
providing a hardware identification for a computer, on which it is allowed that the software application can run together with the add-on data files;
checking, while being connected to the activation server, whether the hardware identification corresponds to the computer, on which the software application is currently running; and
granting the access only to the computer with the hardware identification.

9. A method according to claim 1, wherein the software application is a computer game and the add-on data files are level files and/or map files and/or style files and/or extension files.

10. A system for managing access to add-on data files having an add-on data file attribute, which are used by a software application, comprising:
an access code generator implemented on a computer configured to generate an access code for the add-on data file;
an access code list related to the software application;
an external source outside of the access code list from which the access code is obtained; and
a separate control logic for the software application, the separate control logic being adapted:
to check an authorized use of the software application,
to check input/output commands of the software application to an application programming interface of a code layer, whether an access to a data file with the add-on data file attribute is requested by the software application,
to check whether the access code to access the add-on data file is present in the access code list if the input/output commands request access of the add-on data file, to check whether the access code can be obtained from the external source if the access code is not present in the access code list, and to provide access to the add-on data file if the access code is present.

11. A system, according to claim 10, wherein the software application is combined with the separate control logic such that they are arranged to run in one process.

12. A system according to claim 10, further comprising: a graphical user interface as the external source for obtaining the access code.

13. A system according to claim 12, wherein the graphical user interface is separate from the control logic.

14. A system according to claim 10, further comprising: an activation server being the external source, to which the control logic is connectable during the checking; and the control logic being adapted to check whether the access code is present on the activation server.

15. A system according to claim 10, wherein the control logic is adapted to decrypt the add-on data file if the add-on data file is present in an encrypted version.

16. A system according to claim 10, further comprising:

the software application for using the add-on data files during run-time;

the code layer for controlling access of the software application to the add-on data files, the code layer providing the application programming interfaces; and a linking program to link the separate control logic with the software application so that the separate control logic and the software application are adapted to run in a same process.

* * * * *